(12) United States Patent
Eleftheriadis (10) Patent No.: US 8,432,937 B2
(45) Date of Patent: Apr. 30, 2013

(54) SYSTEM AND METHOD FOR RECOVERING THE DECODING ORDER OF LAYERED MEDIA IN PACKET-BASED COMMUNICATION

(75) Inventor: Alexandros Eleftheriadis, Tenafly, NJ (US)

(73) Assignee: Vidyo, Inc., Hackensack, NJ (US)

( * ) Notice: Subject to any disclaimer, the term of this patent is extended or adjusted under 35 U.S.C. 154(b) by 492 days.

(21) Appl. No.: 12/857,811

(22) Filed: Aug. 17, 2010

(65) Prior Publication Data
US 2011/0222545 A1 Sep. 15, 2011

Related U.S. Application Data

(63) Continuation of application No. PCT/US2009/036702, filed on Mar. 10, 2009.

(60) Provisional application No. 61/035,236, filed on Mar. 10, 2008.

(51) Int. Cl.
*H04N 7/32* (2006.01)
(52) U.S. Cl.
USPC ............... 370/469; 375/240.02; 375/240.08
(58) Field of Classification Search ............ None
See application file for complete search history.

(56) References Cited

U.S. PATENT DOCUMENTS

| | | |
|---|---|---|
| 6,977,934 B1 | 12/2005 | Dalby et al. |
| 2004/0081198 A1* | 4/2004 | Gardner et al. ............... 370/468 |
| 2005/0172028 A1 | 8/2005 | Nilsson et al. |
| 2007/0286283 A1* | 12/2007 | Yin et al. ................. 375/240.16 |
| 2008/0165858 A1* | 7/2008 | Karczewicz et al. .... 375/240.23 |
| 2008/0292005 A1* | 11/2008 | Xu et al. .................. 375/240.28 |
| 2009/0190658 A1* | 7/2009 | Park et al. ................ 375/240.08 |

OTHER PUBLICATIONS

CRC Press LLC) MOE System _ Video, Audio, and Data Mutiplexing [Retrieved from <URL: Info.tech.pub.ro/- documente/Multimedia/2005/multimedia-21-07-05-rezerva/Image_and_Video_Compression_For_Multimedia_Engineering/3491_PDF_C20.pdf>]2000 entire document.
Search Report May 4, 2009.

* cited by examiner

*Primary Examiner* — Hassan Phillips
*Assistant Examiner* — Duc Duong
(74) *Attorney, Agent, or Firm* — Baker Botts LLP (57) ABSTRACT

The present invention relates to the packet-based transmission of media that are coded using a layered representation. In particular, it relates to mechanisms for recovering the decoding order of the media packets when such media is transmitted with arbitrary ordering over one or more packet streams.

19 Claims, 7 Drawing Sheets

Transmitter

FIG. 1: Transmitter

FIG. 2: Receiver

FIG. 3: RTP Header (prior art)

FIG. 4: PACSI NAL Header (prior art)

FIG. 5: PACSI NAL Header with CL-DOP

FIG. 6: Example Decoding Order Recovery

(a) Original packet sequence

(b) Reordered enhancement layer packets (using DONC)

(c) Reordered packets from all layers

FIG. 7: Decoding Order Recovery

SYSTEM AND METHOD FOR RECOVERING THE DECODING ORDER OF LAYERED MEDIA IN PACKET-BASED COMMUNICATION

CROSS-REFERENCE TO RELATED APPLICATIONS

The present application is a continuation of International Application No. PCT/US09/003,6702, filed Mar. 10, 2009 and claims the benefit of U.S. Provisional Application No. 61/035,236, filed Mar. 10, 2008, each of which is hereby incorporated by reference in its entirety.

FIELD

The present invention relates to the packet-based transmission of media that are coded using a layered representation. In particular, it relates to mechanisms for recovering the decoding order of the media packets when such media is transmitted with arbitrary ordering over one or more packet streams.

BACKGROUND

Recent developments in video and audio coding have produced effective layered representations. A layered representation is such that the original signal is represented at more than one fidelity levels using a corresponding number of bitstreams. One example of a layered representation is scalable coding. In scalable coding, such as the one used in ITU-T Recommendation H.264 Annex G (Scalable Video Coding—SVC), incorporated herein by reference in its entirety, a first fidelity point is obtained by encoding the source using standard H.264 techniques (Advanced Video Coding—AVC). An additional fidelity point can be obtained by encoding the resulting coding error (the difference between the original signal and the decoded version of the first fidelity point) and transmitting it in its own bitstream. This pyramidal construction is quite common (e.g., it was used in MPEG-2 and MPEG-4 Video). The first (lowest) fidelity level bitstream is referred to as the base layer, and the bitstreams providing the additional fidelity points are referred to as enhancement layers. The fidelity enhancement for can be in any fidelity dimension. For example, for video it can be temporal (frame rate), quality (SNR), or spatial (picture size). For audio, it can be temporal (samples per second), quality (SNR), or additional channels. Note that the various layer bitstreams can be transmitted separately or, typically, can be transmitted multiplexed in a single bitstream with appropriate information that allows the direct extraction of the sub-bitstreams corresponding to the individual layers.

Another example of a layered representation is multiple description coding. Here the construction is not pyramidal: each layer is independently decodable and provides a representation at a basic fidelity; if more than one layer is available to the decoder, however, then it is possible to provide a decoded representation of the original signal at a higher level of fidelity. One example would be transmitting the odd and even pictures of a video signal as two separate bitstreams. Each bitstream alone offers a first level of fidelity, whereas any information received from other bitstreams can be used to enhance this first level of fidelity. If all streams are received, then there is a complete representation of the original at the maximum level of quality afforded by the particular representation.

Yet another extreme example of a layered representation is simulcasting. In this case, two or more independent representations of the original signal are encoded and transmitted in their own streams. This is often used, for example, to transmit Standard Definition TV material and High Definition TV material. It is noted that simulcasting is a special case of scalable coding where no inter-layer prediction is used.

When layered representations of audio or video signals are transmitted over packet-based networks, there are advantages when each layer (or groups of layers) is transmitted over its own connection, or session. In this way, a receiver that only wishes to decode the base quality only needs to receive the particular session, and is not burdened by the additional bit rate required to receive the additional layers. Layered multicast is a well-known application that uses this architecture. Here the source multicasts the content's layers over multiple multicast channels, and receivers "subscribe" only to the layer channels they wish to receive.

Transmission of video and audio in IP-based networks typically uses the Real-Time Protocol (RTP) as the transport protocol. RTP operates typically over UDP, and provides a number of features needed for transmitting real-time content, such as payload type identification, sequence numbering, time stamping, and delivery monitoring. Each source transmitting over an RTP session is identified by a unique SSRC (Synchronization Source). The packet sequence number and timestamp of an RTP packet are associated with that particular SSRC.

In general, the transmission order of media packets in an RTP stream follows the intended decoding order. In some applications, however, it is desirable to be able to modify the transmission order, "interleaving" the packets. One example is rate shaping, where a transmitter changes the order of transmission of packets in order to better utilize a given fixed available bitrate while at the same time minimizing the buffering that must be used at a receiver prior to commencing playback (ensuring uninterrupted playback after that time).

When interleaving is used, the sequence number present in RTP packets no longer corresponds to the decoding order. At the same time, if, for example, video is used with bi-directional prediction (e.g., MPEG-2 B pictures or H.264 bi-directional B pictures), then the decoding order is no longer identical to the ordering implied by the RTP timestamp of each packet. For example, in MPEG-2 coding with a pattern of I1 B2 B3 P4, then the picture P4 has a later RTP timestamp than B2 but has to be decoded prior to decoding B2 (or B3). For most, if not all codecs, it is impossible to correctly recover the decoding order when interleaving is used with bi-directional prediction, unless one examines the contents of the media packets.

A solution to this problem is RFC 3984, which uses the concept of the "Decoding Order Number" (DON), a specific field in packet headers or a derived variable that indicates the proper decoding order of H.264 "frames", called Network Abstraction Layer (NAL) units. RFC 3984 describes how NAL units are transported in RTP packets, including mechanisms for recovering the decoding order. These mechanisms are only used in the "interleaved" packetization mode of RFC 3984.

The decoding order recovery problem is also present in the transmission of layered media. In this case, the problem is not the recovery of the decoding order within one RTP stream, but rather the recovery of the decoding order considering packets across all layer streams. It is noted that the problem exists regardless if one or more of the sessions are using interleaving, i.e., it is present even if all individual layer packets are transmitted in decoding order within their respective RTP sessions.

One technique that has been proposed for recovering the decoding order in layered transmission of audio and video is used in multimedia multicast distribution using layered audio and video compression, and uses the concepts of a Layer Sequence Number (SEQ) and Cross Layer Sequence Number (XSEQ). The SEQ operates in the same way as the sequence number used in RTP, i.e., it is a sequential numbering scheme within the packet stream of a particular layer. The XSEQ, however, is a numbering scheme that runs sequentially according to decoding order and spans all layers. The combination of SEQ and XSEQ allows a receiver to recover the decoding order even in the presence of packet errors. Although the technique is described within the concept of scalable coding using H.263 Annex O (SNR and spatial scalability), it can be applied to any layered coding scheme.

Another technique proposed for addressing the recovery of decoding order across layers is described in Internet-Draft draft-ietf-avt-rtp-svc-08 (Feb. 25, 2008), incorporated herein by reference in its entirety, and referred to in the following as ID-SVC. This technique is concerned with the definition of an RTP payload format for H.264 SVC, the scalable extension to H.264. The process is based on "Cross-Layer Decoding Order Numbers" (CL-DON). CL-DONs extend the concept of DON found in RFC 3894 such that DON values indicated in the base layer (H.264 compliant by design) are interpreted to be cross-layer. Furthermore, for enhancement layer packets, a DONC field is present in the packet header to indicate the cross-layer DON. CL-DON are similar to the XSEQ numbers discussed above.

A limitation present in ID-SVC is that the CL-DON technique cannot be applied when the base RTP session (the one carrying the base layer) uses the single NAL unit mode or non-interleaved mode of RFC 3984, as there is no provision for placing DONs in the packet headers in these modes. A second limitation is that the CL-DON technique cannot be used when fragmentation is employed in the base layer using the non-interleaved mode (fragmentation unit type A or FU-A packets, in RFC 3984 terminology) as again there is no provision for carrying the DON field in that mode.

SUMMARY

An objective of the present invention is to provide an improved process for recovering the decoding order of layered media that are transported over more than one packet streams with an arbitrary transmission order, without having to add information in base stream packets. A further objective is to provide such a process so that the cross-layer decoding order recovery capability does not impact decodability of the base session from legacy receivers that are not aware of the layered media coding and can only decode the base layer.

Systems and methods for recovering the decoding order of media encoded in a layered representation and transmitted over packet-based communication systems are provided. Specifically, when the various layers are transmitted over more than one session, it is essential to be able to recover the correct order of the individual packets when converted into a single stream for proper operation of other devices, such as decoders. The present invention describes systems and methods in which information is inserted in enhancement layer packets only, and which allows the recovery of the decoding order for both enhancement layer packet as well as base layer packets.

Throughout the figures the same reference numerals and characters, unless otherwise stated, are used to denote like features, elements, components or portions of the illustrated embodiments. Moreover, while the present invention will now be described in detail with reference to the figures, it is being done so in connection with the illustrative embodiments.

DETAILED DESCRIPTION

Figure 1:
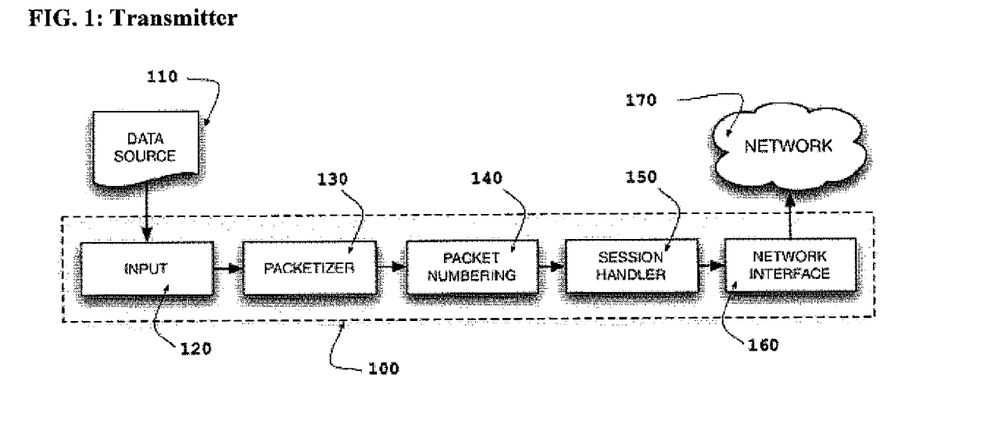
FIG. 1 is a schematic diagram illustrating the structure of the transmitter, in accordance with some embodiments of the present invention.

The system described in this invention comprises a transmitter and a receiver that are interconnected via a communication network. FIG. 1 depicts an illustrative structure of the transmitter 100. In some embodiments, a data source is connected to the Input 120 of the Transmitter 100, providing data (audio, video, or other data) that are coded using a layered structure. The data are then packetized by the Packetizer 130, and appropriate decoding order information is added in the Packet Numbering module 140. The Session Handler 150 is responsible for establishing and maintaining communication with the receiver. It performs all necessary signaling function in order to establish a connection with one (or more) receivers. The Transmitter 100 is equipped with a Network Interface 160 through which packets produced by the Session Handler 150 can be transmitted on the Network 170. In some embodiments, the Network 170 is an IP-based packet network, and the Session Handler 150 and Packetizer 130 are using RTP over UDP for the transport of packets from the transmitter to the receiver.

One embodiment of the present invention uses the ITU-T Recommendation H.264 Annex G (SVC) standard for encoding a video signal at the Data Source 110. The data can be encoded in real-time or they can be pre-encoded and accessed from storage. It is understood that similar techniques can be used for other types of layered media encodings, including encodings for audio, graphics, data. etc. Furthermore, it is assumed that the base layer, which is compliant to H.264 by design (e.g., compliant to at least one of the profiles defined in Annex A of H.264), is packetized according to either the single NAL unit mode or the non-interleaved mode described in RFC 3984. Enhancement layers can be packetized using any of the RFC 3984 modes, including the interleaved mode.

Figure 2:
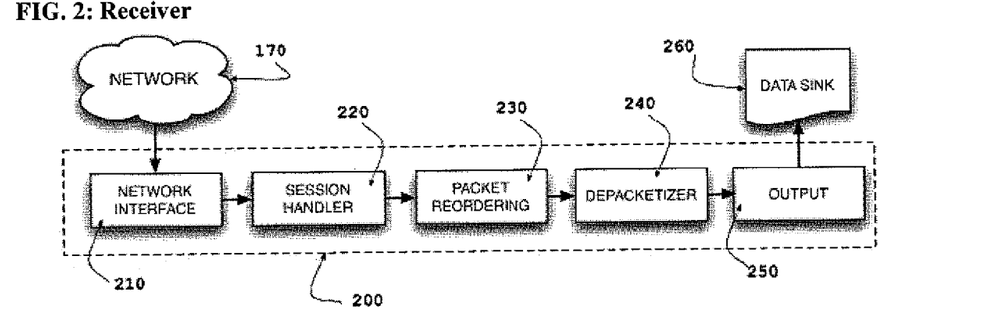
FIG. 2 is a schematic diagram illustrating the structure of the receiver, in accordance with some embodiments of the present invention.

FIG. 2 depicts an illustrative structure of the Receiver 200. In some embodiments, it is comprised of a Network Interface 210 that accepts packets from the Network 170, a Session Handler 220 that terminates the operations of the Transmitter's Session Handler 150, the Packet Reordering module 230 which uses the information provided by the Transmitter's Packet Numbering module 140 in order to recover the correct decoding order of the received packets, and the Depacketizer 240 which converts packets to the format expected by the intended Device Sink 260 connected to the Receiver's Output 250. In one embodiment, the Data Sink 260 can be a video decoder, but can be a storage device or any other type of system that can accept the data provided by the Transmitter's Data Source 110.

In one embodiment of the present invention, the decoding order information is inserted in the RTP packets at the Transmitter 200 in the Packet Numbering module 140 in appropriate packet header fields. The information can be used by the Receiver 200 in the Packet Reordering module 230 in order to re-order the packets (and their contents) to the correct decoding order, prior to making their contents available to the Data Sink 260.

In order to effect decoding order recovery, CL-DONs/XSEQ numbers can be used in enhancement layer packets, since these are not constrained by backwards compatibility to RFC 3984. Such information, however, cannot be placed in the base layer packets carried in the base session, since the packet headers cannot be modified. An alternative to carrying sequencing information the base layer packets is to add information in the enhancement layer packets that would allow recovery of the complete decoding order sequence. In other words, the CL-DONs are used to establish the decoding order for the enhancement layer packets only, and splicing point information is added in enhancement layer packets to facilitate the proper insertion, or "splicing", of base layer packets into the properly ordered stream of enhancement layer packets.

Base layer packet sequencing in the single NAL unit mode and the noninterleaved modes of RFC 3984 is performed using RTP sequence numbers. Specifically, the sequence number order is identical to the decoding order of the encoded data contained in the packets.

Figure 3:
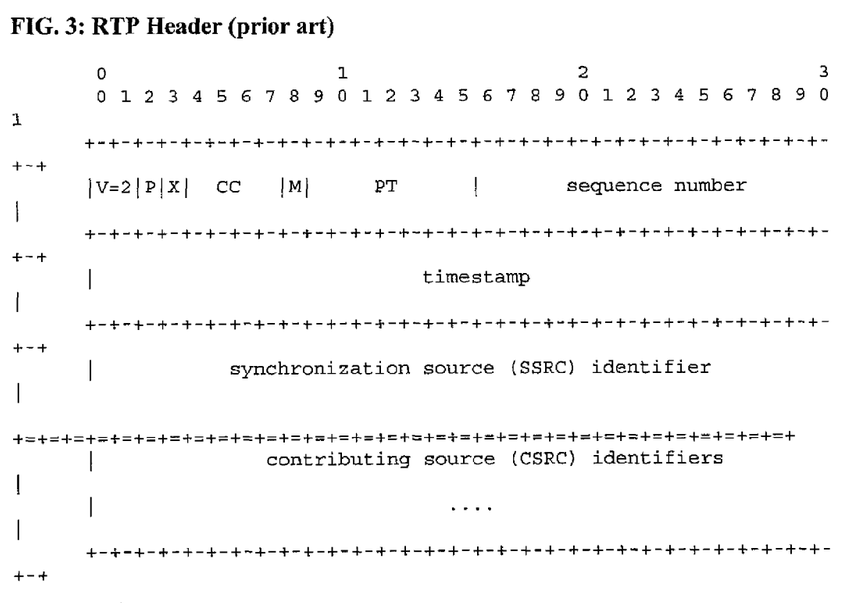
FIG. 3 is a schematic diagram illustrating the structure of RTP packet headers (prior art)

FIG. 3 shows the format of the RTP packet header as provided in RFC 3550. RTP sequence numbers (SN) are unique and monotonically increasing (ignoring rollovers) within a given SSRC (RTP's Synchronization Source identifier). It is therefore possible to associate the ordering of base layer packets with respect to enhancement layer packets by adding information in the enhancement layer packets that indicates the base layer packets' order within the CL-DON of the enhancement layer packets. Such information is referred to herein as Cross-Layer Decoding Order Pointer (CL-DOP), since the information—although present in enhancement layer packets—points to base layer packets.

In another embodiment of the present invention that uses the H.264 SVC standard, enhancement layer data within a particular access unit (AU) follow the base layer data in decoding order. The decoding order within an H.264 AU thus starts at the base layer and then starts to scan packets from enhancement layers. The technique described herein, however, operates correctly with completely arbitrary ordering of base layer packets with respect to enhancement layer packets. Note that the precise decoding order depends on the encoding choices made by the encoder and can be arbitrary.

In one embodiment of the present invention, CL-DONs are used in enhancement layer packets to recover their decoding order. The problem is thus to indicate at which points in the CL-DON sequence the base layer NAL units have to be interjected.

Taking into account that packet losses can result in one or more enhancement layer packets to be lost, the CL-DOP information should be present in all enhancement layer packets in order to allow the recovery of the decoding order of all received packets, regardless of which packets have been lost.

Figure 4:
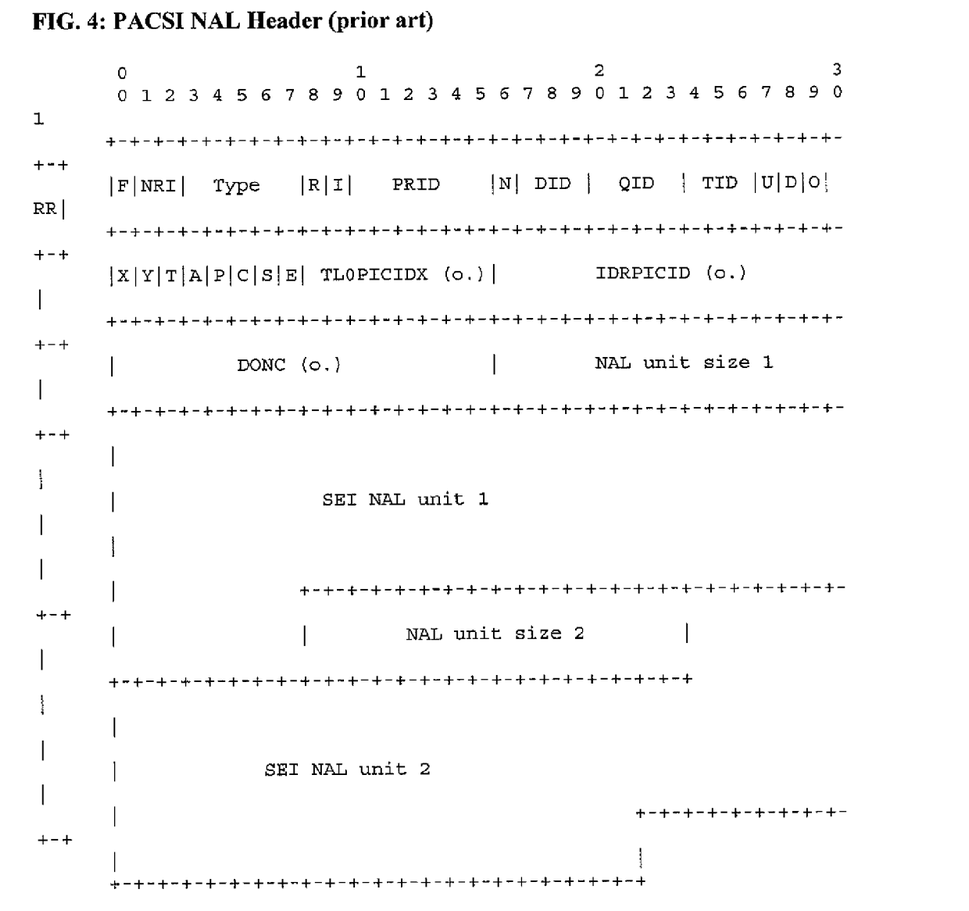
FIG. 4 is a schematic diagram illustrating the structure of PACSI NAL unit headers (prior art)

FIG. 4 depicts the PACSI NAL unit header as defined in ID-SVC. The fields marked with '(o.)' are optional, and their presence is controlled by the various flags present in the header. In this particular example the PACSI NAL unit is shown to contain two SEI NAL units. As explained in ID-SVC, a PACSI NAL unit can contain zero or more NAL units.

In one embodiment of the present invention that uses the ID-SVC payload format, the PACSI NAL header defined in ID-SVC is augmented with three additional optional fields:
 a DOP field of 16 bits, indicating the DONC of the most recent, in decoding order, enhancement layer packet that immediately follows base layer data in decoding order;
 a DOP-H field of 16 bits, indicating the SN of the most recent, in decoding order, packet containing base layer data preceding the packet identified by DOP; and
 DOP-L field of 16 bits, indicating the SN of the oldest, in decoding order, packet of the base session that precedes, in decoding order, the packet identified by DOP-H and is such that no enhancement layer packet exists between DOP-L and DOP-H in decoding order.

The DOP-L and DOP-H fields thus point to a contiguous series of base layer packets. The use of full 16-bit values allows for potential rollover of the SN field. The DOP field points to the exact slice point, in the decoding order of enhancement layer data, where the series defined by DOP-L and DOP-H is to be inserted. The presence of this splicing data in every enhancement layer packet ensures that base layer data decoding order can be recovered regardless of the presence of packet errors in the enhancement layer.

The presence of these fields can be controlled by a flag placed in the PACSI header. Since the PACSI header flags already occupy a full byte in the ID-SVC specification, in a preferred embodiment of the present invention an extra one-bit flag called 'L' can be added and the size of the TL0PICIDX parameter increased from 8 bits to 15, so that the non-optional parameters of the PACSI NAL header occupy an integer multiple of bytes. Increasing the size of the TL0PICIDX parameter can be beneficial, since it improves the robustness of detection of the loss of temporal layer 0 pictures, as explained in commonly assigned International Patent Application PCT/US06/061815, "Systems and Methods for Error Resilience and Random Access in Video Communication Systems," the contents of which are incorporated herein by reference in its entirety.

Figure 5:
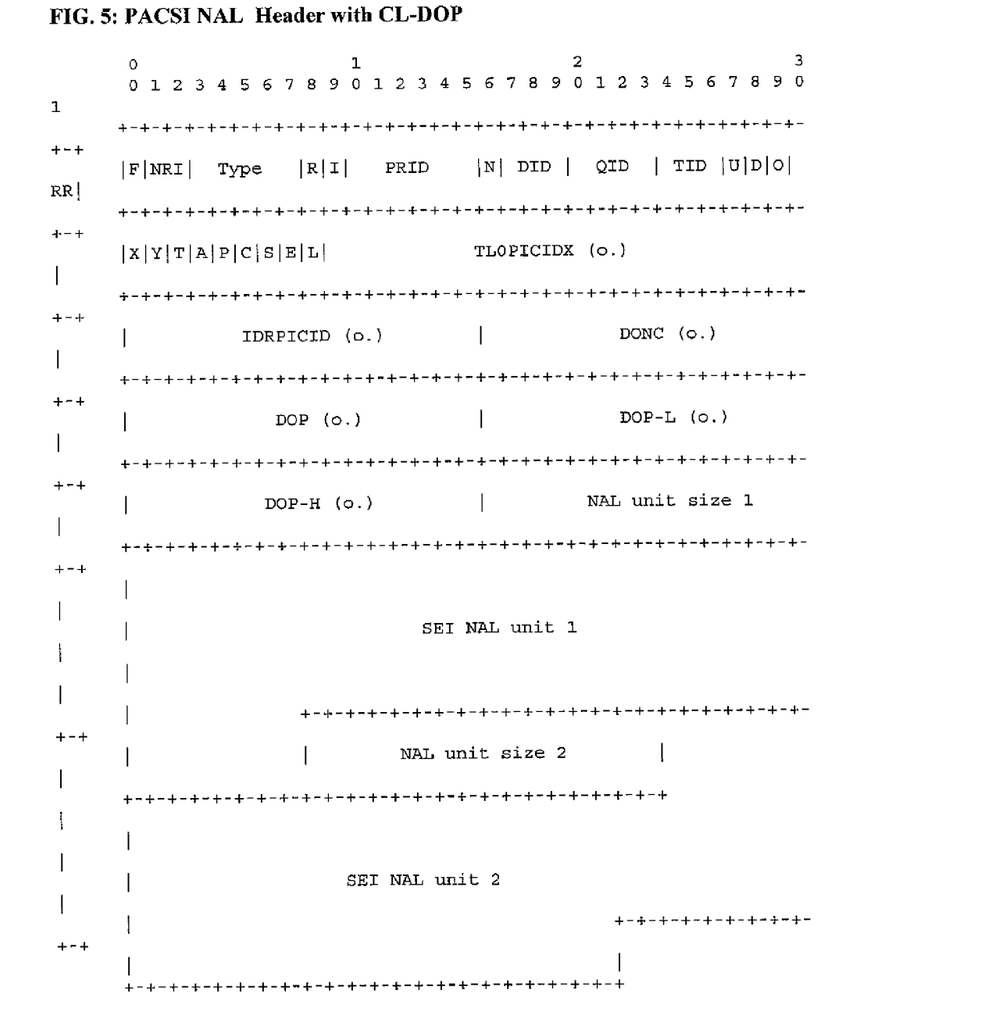
FIG. 5 is a schematic diagram illustrating the structure of PACSI NAL unit headers including CL-DOP information, in accordance with some embodiments of the present invention.

The new PACSI NAL header according to one embodiment of the present invention is shown in FIG. 5. As with FIG. 4, this figure shows the PACSI NAL unit as containing two SEI NAL units. The semantics of the L flag are as follows:
 If the L bit is equal to 1, the optional fields DOP, DOP-L, and DOP-H must be present and are as specified above. Otherwise, if the L bit is equal to 0, the optional fields DOP, DOP-L, and DOP-H must not be present.

Figure 6:
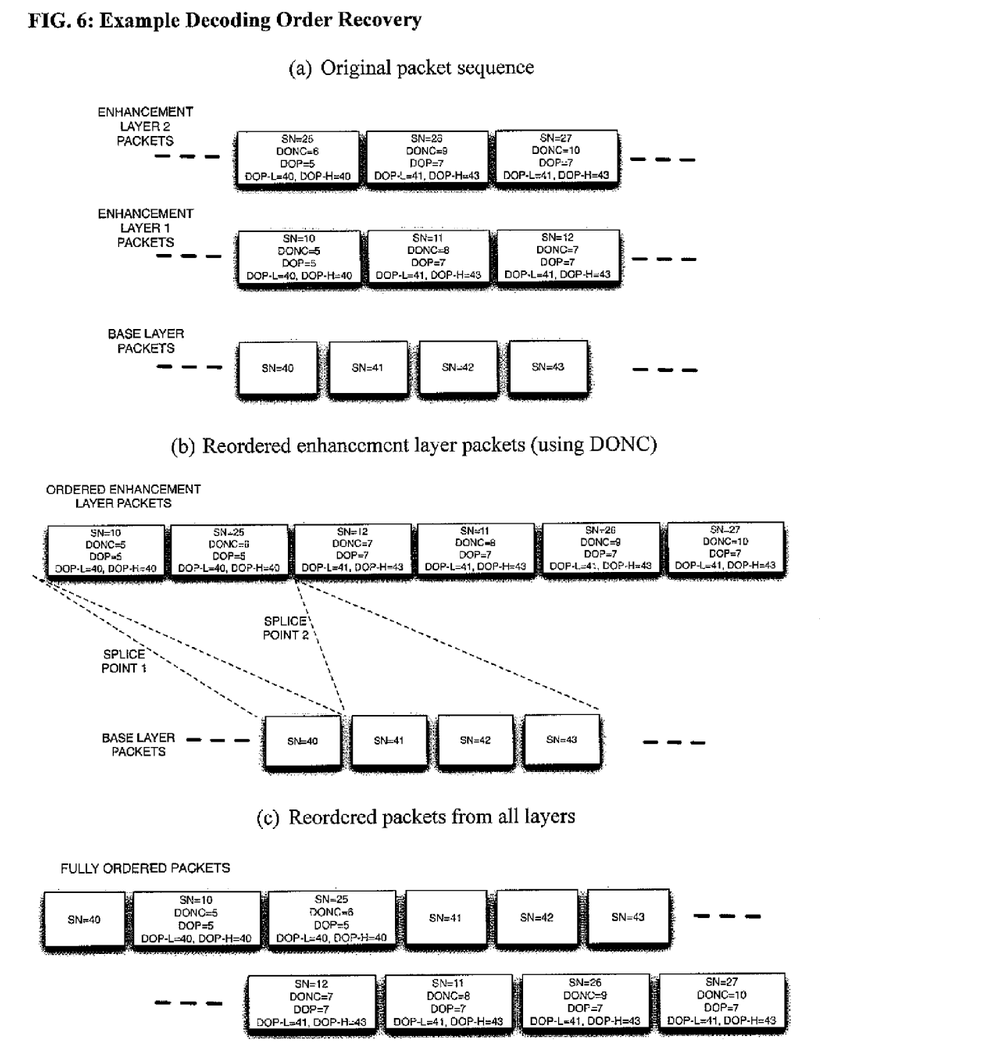
FIG. 6 is a schematic diagram illustrating the process of decoding order recovery in accordance with some embodiments of the present invention.

FIG. 6 (a) shows an example of how the decoding order recovery works with the DONC and DOP information, in accordance with the principles of the present invention. In this example there are three layers, the base layer and two enhancement layers. Each layer has its own sequence numbering (e.g., 10-12 for enhancement layer 1). The DONC field provides the decoding order across the enhancement layers only, i.e., it does not include the base layer packets. The DOP information, i.e., the DOP, DOP-L, and DOP-H fields, indicate the splice points in the enhancement layer packet sequence were base layer packets must be inserted for full decoding order recovery. In this example enhancement layer 1 is shown as interleaved. Notice that the packet with SN=12 has DONC=7, and is transmitted after the packet with SN=11 which has DONC=8, i.e., it comes after in decoding order.

Using the DONC information, the correct decoding order can be reconstructed for enhancement layer packets, as shown in FIG. 6 (b). The dotted lines in the figure indicate the position of the splice points in the enhancement layer packet stream, as well as the range of packets in the base layer packet sequence that are to be inserted in the splice points. The first slice point (SLICE POINT 1), defined by DOP=5, DOP-L=40, and DOPH=40, involves a single base layer packet (the one with SN=40), which is to be inserted right before the enhancement layer packet with DONC=5, i.e., the packet with SN=10. The second slice point (SLICE POINT 2), defined by DOP=7, DOP-L=41, and DOPH=43, involves three base layer packets (the ones with SNs from 41 to 43), which are to be inserted right before the enhancement layer packet with DONC=7, i.e., the packet with SN=12. The fully ordered packet sequence is depicted in FIG. 6 (c).

It is noted that RTP packets constructed under ID-SVC can contain more than one NAL unit. In the non-interleaved packetization mode as defined in RFC 3984, the decoding order of the NAL units is implied by their order within the RTP packet. In the interleaved packetization mode, the DON values derived as specified in RFC 3984 must indicate CL-DON, as explained in Section 7.1 of ID-SVC. In other words, the DON values of RFC 3984 are forced to have DONC semantics. In the following, both cases are referred to as DONC, regardless if the value was obtained from the PACSI NAL unit header of the packet that the NAL unit was contained, or if it was derived as a DON value per RFC 3984.

Figure 7:
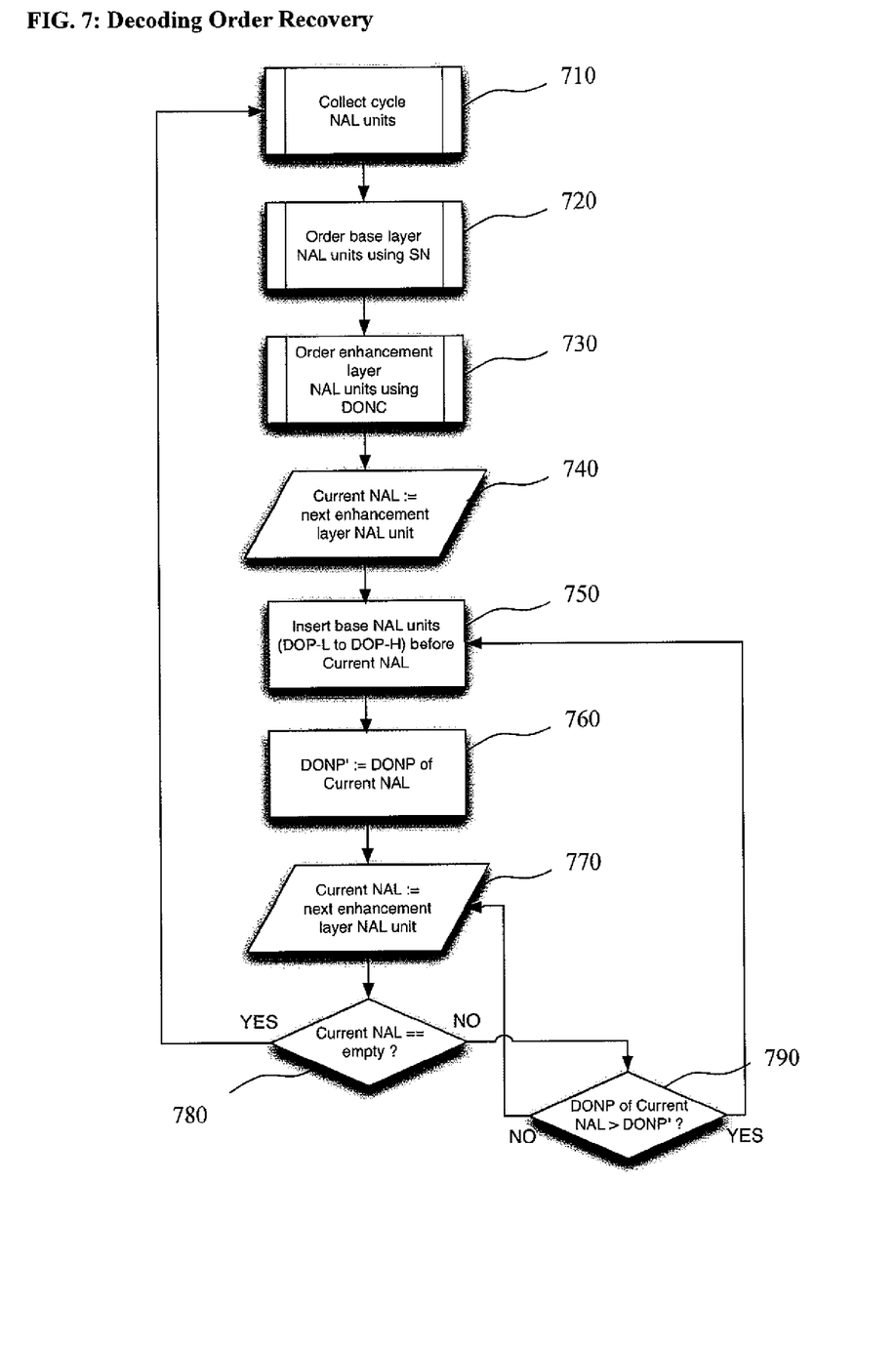
FIG. 7 is a schematic diagram illustrating the process of decoding order recovery in accordance with some embodiments of the present invention.

Referring to FIG. 7, an exemplary method for recovering the decoding order using the CL-DOP/CLDON technique, in accordance with the principles of the present invention, will be described. It is assumed that base layer sessions and enhancement layer sessions are associated with each other using signaling means, such as SDP. This way a receiver can know which base layer SSRC corresponds to a particular enhancement layer SSRC.

At 710, "Collect cycle NAL units," all NAL units (base layer or enhancement layer) that belong to the current iteration of the algorithm are collected, such as an entire access unit or other arbitrarily long packet sequence.

At 720, received NAL units of the base layer session are ordered according to increasing packet SN's within a particular SSRC, and their position within a packet if more than one NAL units is present in a packet (i.e., in an aggregation unit in the noninterleaved packetization mode). Each base layer NAL unit is associated with the SN value of the packet it was contained in.

At 730, received NAL units of the enhancement layers are ordered according to their CL-DON numbers, as described in Section 8.1.2 of ID-SVC (using the DONC field information). In some embodiments, only enhancement layer data can be used in the CLDON decoding order recovery process. Each enhancement layer NAL unit is associated with its DONC value, as well as the DOP, DOP-L, and DOP-H values of the PACSI NAL header of the RTP packet is was contained in. The first enhancement layer NAL unit becomes the 'current enhancement layer NAL unit,' 740.

At 750, the values of DOP, DOP-L, and DOP-H are obtained from the current enhancement layer NAL unit. The series of base layer NAL units starting from the earliest one with SN equal to DOP-L and ending in the latest base layer NAL unit having SN equal to DOP-H, inclusively, are inserted in the sequence of NAL units at 730 immediately before the current enhancement layer NAL unit. If any of these base layer NAL units are missing they are simply ignored.

At 760, the value of DOP is saved in the variable DONP'.

At 770, the sequence of enhancement layer NAL units is scanned until the first one is found in which the DONP value is different than DONP'. This indicates that a new splice point has been detected. This NAL unit becomes the current enhancement layer NAL unit.

If necessary, as determined by 780 and 790, the scanning/splicing process continues from 750.

This method addresses completely the decoding order recovery problem for both the single NAL unit mode and non-interleaved modes of RFC 3894, and applies to all types of base layer packets (STAP-A, STAP-B, MTAP16, MTAP24, FU-A, and FUB).

Note that the above method can implemented over arbitrarily long packet sequences. Since the length of the packet sequence is directly proportional to the delay in being able to deliver ordered data, it is advantageous to minimize the length of the packet sequence in which the algorithm operates at a time. If the single NAL unit or noninterleaved modes are used, then the algorithm can be operated on a per-access unit basis. If the interleaved mode is used for one or more of the enhancement layer sessions, the minimum length depends on the maximum interleaving depth used among the enhancement layer sessions. Further optimizations can be made when considering special constraints that can be placed in the data. For example, in H.264 SVC the base layer data are always placed earlier in decoding order than enhancement layer data. As a result, a single splice per access unit will be present in the packet sequence. The method above can thus be modified so that 770 is modified to scan forward for the next NAL unit that belongs to a different access unit than the current enhancement layer NAL unit. Detection can be performed by comparing the associated RTP timestamps.

Alternative techniques of indicating the splice points in the enhancement layers' decoding order sequence in order to insert the relevant base layer packets can be easily devised. For example, rather than transmitting a high and low values for the sequence number of the base layer, one could use a high value coupled with a difference value that would indicate how far back the spliced sequence extends. Finally, it is possible in alternative embodiments, the CL-DOP and CL-DON/XSEQ data can be carried in separate packets, rather than in fields of the packets carrying the actual data. For example, in reliable networks where packet losses are minimal or non-existent, this information could be carried in a separate packet that precedes the enhancement layer packet it applies to.

What is claimed is:

1. A system for transmitting data encoded using a layered encoding algorithm comprising:

a data input for receiving the encoded data with a plurality of layers including one base layer and one or more enhancement layers;

packetizing means for inserting the received encoded data into one or more predetermined packet structures, the data associated with each encoded layer being inserted into a different sequence of packets;

packet numbering means for assigning a data sequence number to each enhancement layer packet generated by the packetizing means, the data sequence numbers assigned to the enhancement layers' packets running in a single sequence indicative of the order of receipt at the data input of encoded data inserted into the enhancement layer packet;

wherein the packet numbering means is arranged to assign a base layer data sequence numbering to each base layer packet generated by the packetizing means, said base layer sequence numbering being indicative of the order of receipt at the data input of encoded data inserted into the base layer packet;

packet numbering pointer means for associating each enhancement layer packet with splice point information that indicates where base layer packets have to be inserted and which base layer packets have to be inserted in the said single sequence of enhancement layers' packets in order for both base and enhancement layers' packets to be in the same order as the order of a network interface for transmitting packets so created and for transmitting the assigned data sequence numbers and splice point information.

2. The system of claim 1 wherein the splice point information is comprised of a pointer to the sequence number of the most recent enhancement layer packet where base layer packets have to be inserted, as well as pointer information to the base layer data sequence number for identifying the first and last of the set of base layer packets that have to be inserted prior to the said most recent enhancement layer packet, in order for both base and enhancement layers' packets to be in the same order as the order of receipt, at the data input, of encoded data inserted into the packets.

3. The system of claim 1 wherein the splice point information is comprised of a pointer to the sequence number of the most recent enhancement layer packet where base layer packets have to be inserted, as well as pointer information to the base layer data sequence number for identifying either the first or last as well as the total number of base layer packets that have to be inserted prior to the said most recent enhancement layer packet, in order for both base and enhancement layers' packets to be in the same order as the order of receipt, at the data input, of encoded data inserted into the packets.

4. The system of claim 1 wherein the packetizing means is arranged to generate one or more further sequence of packets for use in conveying data sequence numbers, base layer data sequence numbers and splice point information assigned by the packet numbering means.

5. The system of claim 1 wherein the packet numbering means is arranged to write each said data sequence number, base layer data sequence number, and splice point information at predetermined positions within each packet.

6. A method for transmitting data frames encoded using a layered encoding algorithm over a communication network, the method comprising:
receiving encoded data with a plurality of layers including one base layer and one or more enhancement layers;
inserting data from said encoded data into packets generated according to a predetermined packet structure, data from each layer of encoded data being inserted into a separate sequence of packets;
assigning to each enhancement layer packet a data sequence number, said data sequence numbers running in a single sequence indicative of the required order;
assigning a base layer data sequence number, said base layer sequence number running in a single sequence indicative of the required order;
assigning to each enhancement layer packet splice point information that indicates where base layer packets have to be inserted and which base layer packets have to be inserted in the said single sequence of enhancement layers' a packets in order for both base and enhancement layers' packets to be in the required order, for subsequent presentation to a decoder; and
transmitting said packets and said data sequence numbers along with said packets.

7. The method of claim 6, wherein the splice point information is comprised of a pointer to the sequence number of the most recent enhancement layer packet where base layer packets have to be inserted, as well as pointer information to the base layer data sequence number for identifying the first and last of the set of base layer packets that have to be inserted prior to the said most recent enhancement layer packet, in order for both base and enhancement layers' packets to be in the required order.

8. The method of claim 6, wherein the splice point information is comprised of a pointer to the sequence number of the most recent enhancement layer packet where base layer packets have to be inserted, as well as pointer information to the base layer data sequence number for identifying either the first or last as well as the total number of base layer packets that have to be inserted prior to the said most recent enhancement layer packet, in order for both base and enhancement layers' packets to be in the required order, for subsequent presentation to a decoder.

9. The method of claim 6, further comprising:
receiving said data packets of at least one of said sequence of enhancement layer packets and the sequence of base layer packets and reordering the data packets in order assigned data sequence number and assigned base layer data sequence number according to the splice point information associated with the enhancement layer packets.

10. The method of claim 6, wherein the layered encoding algorithm is a video encoding algorithm that outputs video frames not in the order in which they were sampled but in the order in which they are to be decoded.

11. The method of claim 6, further comprising:
writing each of said data sequence number, base layer data sequence number, and splice point information at predetermined positions within each packet.

12. A method for ordering packets received within a plurality of separately accessible sequence of packets received over a communications network, each sequence of data packets conveying data frames relating to a different layer of encoded data output by a layered encoding algorithm, the layers including one base layer and one or more enhancement layer, each layer having associated packets, each enhancement layer packet having assigned thereto a data sequence number indicative of the order of output of encoded data, conveyed by said packet from said encoding algorithm, each base layer packet having assigned thereto a further base layer data sequence number indicative of the position of said base layer data packet within the base layer sequence of data packets, and each enhancement layer packet having assigned thereto splice point information that indicates where base layer packet data have to be inserted and which base layer packet data have to be inserted, in the enhancement layer packet sequence, the method comprising:
selecting enhancement layer packets in order of assigned data sequence number; if the splice point information associated with the selected enhancement layer packet is the first splice point information or different from the more recent splice point information, outputting the base layer packets pointed to be the splice point information in the order indicated by the base layer packet data sequence number; and
outputting the selected enhancement layer packet.

13. A non-transitory computer-readable medium for transmitting data frames encoded using a layered encoding algorithm over a communication network, the computer-readable medium having a set of instructions operable to direct a processing system to:

receive encoded data with a plurality of layers including one base layer and one or more enhancement layers;

insert data from said encoded data into packets generated according to a predetermined packet structure, data from each layer of encoded data being inserted into a separate sequence of packets;

assign to each enhancement layer packet a data sequence number, said data sequence numbers running in a single sequence indicative of the required order;

assign a base layer data sequence number, said base layer sequence number running in a single sequence indicative of the required order;

assign to each enhancement layer packet splice point information that indicates where base layer packets have to be inserted and which base layer packets have to be inserted in the said single sequence of enhancement layers' a packets in order for both base and enhancement layers' packets to be in the required order, for subsequent presentation to a decoder; and transmit said packets and said data sequence numbers along with said packets.

14. The non-transitory computer-readable medium of claim 13, wherein the splice point information is comprised of a pointer to the sequence number of the most recent enhancement layer packet where base layer packets have to be inserted, as well as pointer information to the base layer data sequence number for identifying the first and last of the set of base layer packets that have to be inserted prior to the said most recent enhancement layer packet, in order for both base and enhancement layers' packets to be in the required order.

15. The non-transitory computer-readable medium of claim 14, wherein the splice point information is comprised of a pointer to the sequence number of the most recent enhancement layer packet where base layer packets have to be inserted, as well as pointer information to the base layer data sequence number for identifying either the first or last as well as the total number of base layer packets that have to be inserted prior to the said most recent enhancement layer packet, in order for both base and enhancement layers' packets to be in the required order, for subsequent presentation to a decoder.

16. The non-transitory computer-readable medium of claim 14, wherein the set of instructions is further operable to direct the processing system to:

receive said data packets of at least one of said sequence of enhancement layer packets and the sequence of base layer packets and reordering the data packets in order assigned data sequence number and assigned base layer data sequence number according to the splice point information associated with the enhancement layer packets.

17. The non-transitory computer-readable medium of claim 13, wherein the layered encoding algorithm is a video encoding algorithm that outputs video frames not in the order in which they were sampled but in the order in which they are to be decoded.

18. The non-transitory computer-readable medium of claim 13, wherein the set of instructions is further operable to direct the processing system to:

write each of said data sequence number, base layer data sequence number, and splice point information at predetermined positions within each packet.

19. A non-transitory computer-readable medium for ordering packets received within a plurality of separately accessible sequence of packets received over a communications network, each sequence of data packets conveying data frames relating to a different layer of encoded data output by a layered encoding algorithm, the layers including one base layer and one or more enhancement layer, each layer having associated packets, each enhancement layer packet having assigned thereto a data sequence number indicative of the order of output of encoded data, conveyed by said packet from said encoding algorithm, each base layer packet having assigned thereto a further base layer data sequence number indicative of the position of said base layer data packet within the base layer sequence of data packets, and each enhancement layer packet having assigned thereto splice point information that indicates where base layer packet data have to be inserted and which base layer packet data have to be inserted, in the enhancement layer packet sequence, the computer-readable medium having a set of instructions operable to direct a processing system to:

select enhancement layer packets in order of assigned data sequence number; if the splice point information associated with the selected enhancement layer packet is the first splice point information or different from the more recent splice point information, output the base layer packets pointed to be the splice point information in the order indicated by the base layer packet data sequence number; and output the selected enhancement layer packet.

* * * * *